United States Patent [19]
Fox et al.

[11] Patent Number: 5,339,906
[45] Date of Patent: Aug. 23, 1994

[54] POSITON FEEDBACK MECHANISM FOR AN IMPLEMENT

[75] Inventors: Robert E. Fox; William L. Smith, Jr., both of Des Moines; Donald R. Flugrad, Jr., Ames, all of Iowa

[73] Assignee: Deere & Company, Moline, Ill.

[21] Appl. No.: 1,975

[22] Filed: Jan. 8, 1993

[51] Int. Cl.⁵ ............................................. A01B 63/111
[52] U.S. Cl. ........................................ 172/4; 172/4.5; 33/1 PT
[58] Field of Search .................. 172/4, 4.5, 6; 33/1 H, 33/1 PT, 521

[56] References Cited

U.S. PATENT DOCUMENTS

| 4,045,893 | 9/1977 | Feinzilber et al. | 172/4.6 |
| 4,140,420 | 2/1979 | Swisher, Jr. et al. | 172/4.5 |
| 4,486,955 | 12/1984 | Fisher et al. | 33/1 PT |
| 5,132,347 | 10/1992 | Miller . | |
| 5,240,079 | 8/1993 | Schmidt | 172/6 |

Primary Examiner—Randolph A. Reese
Assistant Examiner—Spencer Warnick

[57] ABSTRACT

A feedback mechanism for providing an implement position signal includes a rotary potentiometer mounted on the implement frame adjacent the rockshaft with the axis of the potentiometer shaft extending parallel to the rockshaft. A linkage structure includes a potentiometer arm connected to a rockshaft arm by a link such that the angle the potentiometer arm forms with the link is acute when the implement is in the transport position and obtuse when the implement is in the lowered field-working range. At the lowermost position of the implement, the link and potentiometer arm approach an over-center position. The linkage structure provides amplified rotation of the potentiometer shaft relative to the rockshaft when the implement is in the field-working range of positions, while rotation of the shaft is reduced relative to rockshaft rotation when the implement is raised above the field-working position. In the preferred embodiment, rotation of the rockshaft 10° in the field-working range results in rotation of over 30° of the potentiometer shaft. Rotation of the rockshaft 10° in the upper range of raised transport positions results in less than about 8° of potentiometer shaft rotation. The amplified rotation in the field-working range significantly increases accuracy and repeatability of the feedback signal.

15 Claims, 3 Drawing Sheets

POSITION FEEDBACK MECHANISM FOR AN IMPLEMENT

BACKGROUND OF THE INVENTION

1) Field of the Invention

The present invention relates generally to position control for agricultural implements and more specifically to an improved transducer arrangement for providing an electrical feedback signal to an electrohydraulic depth control system.

2) Related Art

Numerous systems are available for automatically controlling implement position. One such system is shown in U.S. Pat. No. 5,132,347, of common ownership with the present application. An electronic control unit (ECU), such as shown and described in U.S. Pat. No. 4,979,092, is utilized to control the trailing implement in response to input signals including a lever control signal, a position sensor signal and a draft force sensor signal. When the control input from the implement is plugged into the ECU, control is shut off to the 3-point hitch and automatically transferred to the trailing implement. An implement position sensor, such as a rotary potentiometer, is mounted on the towed implement to sense the position of the frame and tools relative to the wheels.

One problem encountered with such automatic position control of a trailing implement is providing a good feedback system which is accurate and supplies repeatable feedback signals so that implement position can be easily ascertained and repeated after the position control cylinder has been cycled. The depth control range for operating a tillage tool in the field-working position is usually a relatively small fraction of the overall range of vertical adjustment of the implement from the uppermost transport position to the lowermost field-working position. The normal depth control range for ground working operations of an implement such as a disk harrow may be several inches while the complete cylinder stroke results in frame movement of sixteen to twenty inches or more. Once the implement is lifted from the ground, returning the implement to the depth setting of the previous ground-working pass is dependant on the accuracy and repeatability of the feedback signal. Providing accurate and repeatable feedback from the implement, particularly when the depth control range is relatively small, has been a continuing source of difficulty.

BRIEF SUMMARY OF THE INVENTION

It is therefore an object of the invention to provide an improved implement position feedback system. It is another object to provide such a system which overcomes the aforementioned problems.

It is another object to provide an improved hydraulic system for a towed implement which includes a depth control feedback arrangement with improved sensitivity in the field-working depth control range. It is a further object to provide such a system wherein implement position can be easily and accurately ascertained and repeated after the depth control cylinder has been cycled, even when the range of field-working positions is a relatively small fraction of the overall range of the cylinder being controlled.

A feedback mechanism in accordance with the invention for providing an implement position signal includes a rotary potentiometer mounted on the implement frame adjacent the rockshaft with the axis of the potentiometer shaft extending parallel to the rockshaft. A linkage structure includes a potentiometer arm connected to a rockshaft arm by a link such that angle the potentiometer arm forms with the link is acute when the implement is in the transport position and obtuse when the implement is in the lowered field-working range. At the lowermost position of the implement, the link and potentiometer arm approach an overcenter position. The linkage structure provides amplified rotation of the potentiometer shaft relative to the rockshaft when the implement is in the field-working range of positions, while rotation of the shaft is reduced relative to rockshaft rotation when the implement is raised above the field-working position. In the preferred embodiment, rotation of the rockshaft 10° in the field-working range results in rotation of over 30° of the potentiometer shaft. Rotation of the rockshaft 10° in the upper range of raised transport positions results in less than about 8° of potentiometer shaft rotation. The amplified rotation in the field-working range significantly increases accuracy and repeatability of the feedback signal. The relatively simple and inexpensive structure has few wear points so that inaccuracy caused by wear and looseness in the feedback system is minimized.

These and other objects, features and advantages of the present invention will become apparent to one skilled in the art upon reading the following detailed description in view of the drawings.

DETAILED DESCRIPTION OF THE DRAWINGS

Figure 1:
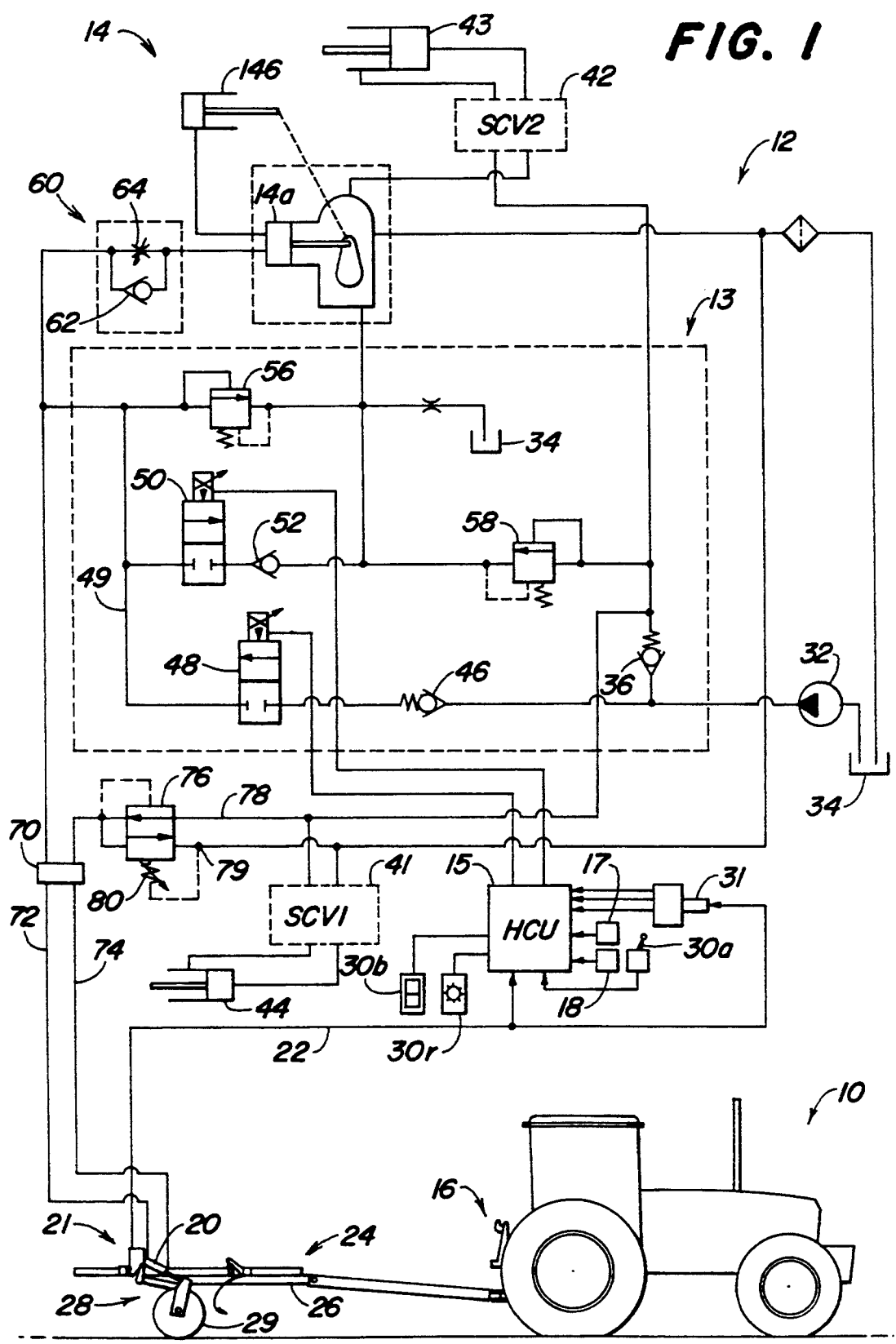
FIG. 1 is a schematic representation of a hydraulic control system with a feedback arrangement constructed according to the invention.

Referring now to FIG. 1, therein is shown a tractor 10 including a hydraulic control system 12 with a hydraulic hitch valve assembly 13 operably connected to a rockshaft assembly 14 with single acting rockshaft and lift assist cylinder 14a and 14b. An electronic or hitch control unit (HCU) 15 is connected to the valve assembly 13 for controlling a three-point hitch 16 connected to the rockshaft assembly 14. During operation in the hitch control mode, the HCU receives hitch position and/or draft load feedback signals from transducers 17 and 18, respectively, which are processed in a conventional manner to automatically position the hitch 16.

The HCU 15 alternately controls an implement control cylinder, shown as a depth control and lift cylinder 20. A feedback control system 21, responsive to movement of the trailing implement as a result of extension and retraction of the cylinder 20, includes a feedback line 22 which is plugged into the HCU 15. When the HCU 15 senses the presence of a feedback signal from the line 22, HCU operation is automatically switched from the normal hitch control mode to a drawn implement control mode. In the drawn implement mode, the HCU utilizes the position feedback signal rather than the hitch position or draft load feedback signals to provide control signals to the valve assembly 13.

As shown in FIG. 1, a drawn implement 24 is connected to the tractor 10 and includes a frame 26. The frame 26 is supported for movement vertically between a raised transport position (shown) and a range of lowered field-working positions by a conventional lift assembly 28 including wheels 29 and the cylinder 20. The feedback control system line 22 is connected to the HCU 15 to cause the HCU to operate in the drawn implement control mode and to provide feedback to the HCU for implement position control. A potentiometer connected for rotation with the implement rockshaft and described in detail below provides a voltage signal between about one to four volts on the line 22 when the implement 24 is connected to the tractor.

In the drawn implement control mode, the HCU 15 utilizes the feedback signal on the line 22 to position the trailing implement, generally in the same manner as the conventional ECU utilizes the hitch position feedback signal in the normal hitch control mode to vertically position the 3-point hitch 16. A hitch control lever 30a, which normally controls the rockshaft position in the hitch control mode, controls implement position in the implement control mode. The feedback line and a readout 31, preferably in the form of a voltmeter connected to the feedback line 22, provide good indications of implement position to both the operator and to the HCU so that implement position is accurately repeatable as the implement cycles between raised transport and lowered field-working positions. A raise/lower switch 30b which controls the rockshaft in the hitch control mode, controls the raising and lowering of the implement to and from the position selected by the lever 30a when the HCU is in the implement control mode. A raise limit control 30r sets uppermost hitch position in the hitch control mode and uppermost implement position in the drawn implement control mode. During operation in the hitch control mode, movement of the switch 30b momentarily to the raise position causes the hitch 14 to raise to the position determined by the control 30r. The controls 30a, 30b and 30r conveniently set the position of the implement 24 in the same manner as they set the hitch position, except that holding the rocker switch 30b in the raise position in the drawn implement control mode maintains continuous hydraulic fluid flow so that multiple cylinders 20 can be fully extended and rephased. Also, releasing the switch 30b from the raise position causes the implement to remain in the current position until the switch is rocked momentarily to the lower position to cause the implement to return to the position determined by the lever 30a.

The hydraulic system 12 includes a source of hydraulic fluid under pressure 32 with a reservoir 34. The source 32 is connected through a check valve 36 to selective control valves 41 and 42 (SCV1 and SCV2) which control the cylinders 43 and 44, respectively. The source 32 is also connected through a check valve 46 to a solenoid-operated pressure control valve 48 having an output 49 which communicates with the base or extend end of the cylinder 20 when the implement 24 is connected to the tractor. The output 49 is also connected to a second solenoid-operated control valve 50 which selectively provides a return to the reservoir 34 via check valve 52. A pressure responsive relief valve 56 is also connected between the output 49 and the reservoir 34. A second relief valve 58 in the assembly 13 is connected between the check valve 36 and the reservoir 34.

A hitch lock-up valve 60 with a check-valve 62 and a fully closable adjustable restriction 64 is installed between the output 49 of the hitch control assembly 13 and the rockshaft assembly 14 so that free flow is provided to the assembly to raise the hitch 16. With the restriction 64 completely closed, the return path for the hydraulic fluid is completely blocked so the hitch 16 remains in the raised position regardless of the changes in pressure at the output 49 which result from HCU operation of the valve assembly 13. The check valve 62 provides any fluid flow necessary to overcome any hitch cylinder leakage or the like that might otherwise cause the hitch position to drift.

The output line 49 of the control assembly 13 is coupled at location 70 to the base or extend side of the implement cylinder 20 by a line 72. A return line 74 connected to the opposite or retract end of the cylinder 20 is coupled at 70 to a reducing/relieving valve 76 having a first port 78 connected via the check valve 36 to the source 32 and a second port 79 connected to the reservoir 34. The valve 76 maintains a positive pressure on the retract side of the cylinder 20 when the extend side of the cylinder 20 is returned to reservoir by actuating the valve 50. The retract-side pressure, which is regulated by a control 80, is adjusted to provide just enough pressure to retract the cylinder 20 fully (i.e., to raise the implement wheels off the ground in the embodiment shown when the line 72 is returned to reservoir through the valve 50). When the cylinder 20 is extended, the pressure in the line 74 moves the valve from the position shown in FIG. 1 to the lower position so that return fluid flows from the line 74 through to the port 79 and to the reservoir The lift assembly includes a rockshaft 100 connected to a lift arm 102 extending downwardly and forwardly to a walking beam which supports the wheels 29. The cylinder 20 has a base end connected to a mast 108 fixed to the frame 26. The rod end of the cylinder 20 is connected to an arm 112 fixed to the rockshaft 100 for rotation therewith about the rockshaft axis.

The feedback mechanism

The feedback mechanism 21 includes a rotary potentiometer 120 mounted on the frame 26 forwardly of the rockshaft 100 by an upright support 122. The axis-of the potentiometer shaft 120a extends parallel to the axis of the rockshaft 100. A linkage structure indicated at 123 provides amplified rotation of the potentiometer shaft 120a relative to the rockshaft 100 when the implement is in the field-working range of positions, while rotation of the shaft 120a is reduced relative to rockshaft rotation when the implement is raised above the field-working position.

The linkage structure 123 includes a lever arm 124 of length R4 which extends radially outwardly from the shaft 120a. A second lever arm 126 of length R2 less than R1 is fixed to the rockshaft 100 and extends upwardly therefrom. The distance between the axes of rotation of the shafts is R1 with R1 being substantially greater then the sum of the lever arm lengths (R2+R4). The first and second lever arms 124 and 126 are operably joined by a link 128 of length R3 pivotally connected to the upper ends of the arms.

In the fully lowered field-working position (V1), a line which connects the pivot points of the link 128 and the lever 124 forms an obtuse angle ($\alpha 1$) with a line which extends radially from the axis of shaft 120a through the pivot between the link 128 and the arm 124, with the angle α1 approaching 180° In the fully raised position (V2) the angle α2 is acute. The corresponding angle between the arm 126 and the link 128 remains in a range from slightly greater than 90° to slightly less than 180° between positions V1 and V2 of FIG. 3, with the maximum angle occurring when the implement is in the fully raised position (V2).

Figure 3:
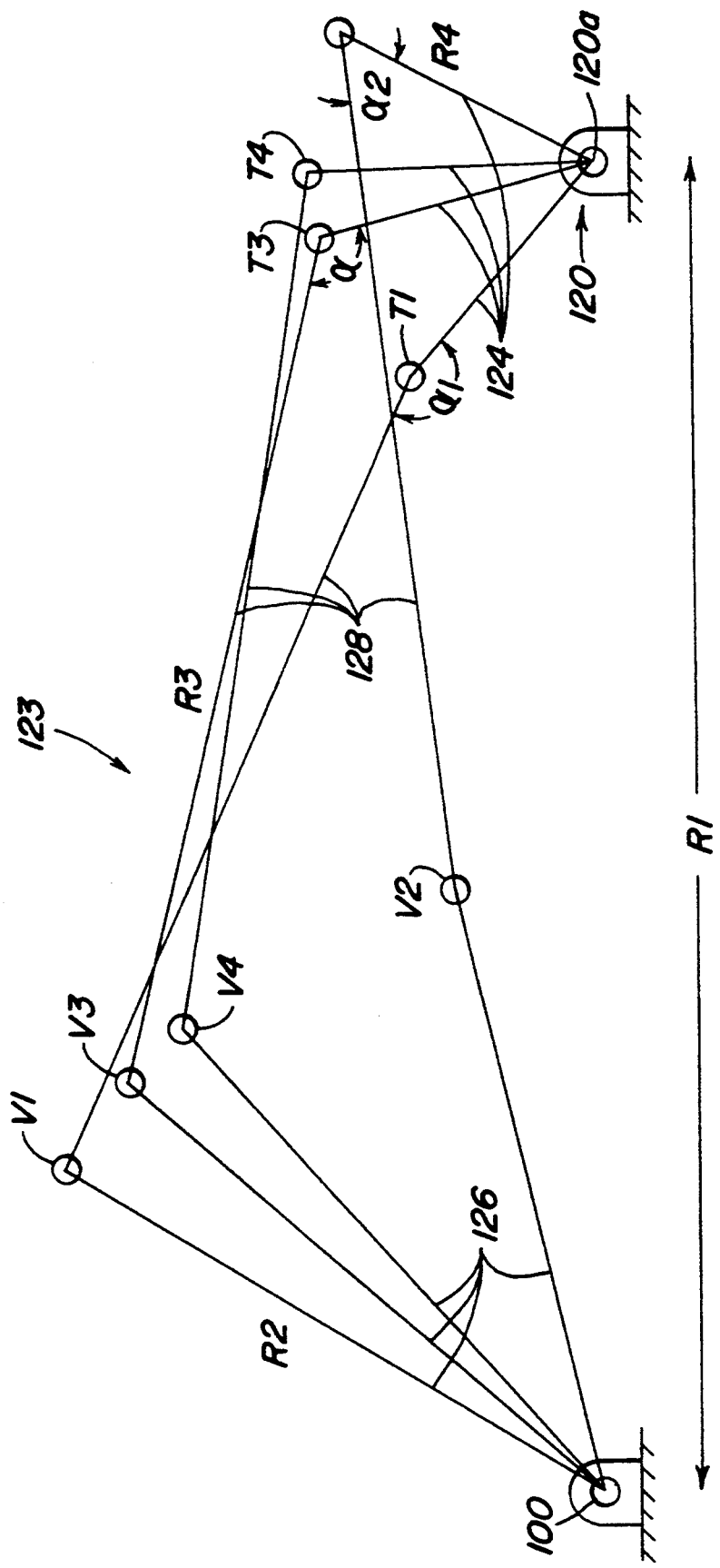
FIG. 3 is an enlarged view showing schematically the relationship of lever arms and connecting link for the potentiometer linkage of FIG. 2.

By way of example only, the following relative lengths for the R variables of FIG. 3 have been found to provide a good range of potentiometer rotation in the depth control range of the implement with substantially reduced rotation in the non-depth control range:

R1=1.00

R2=0.465

R3=0.650

R4=0.207

Figure 2:
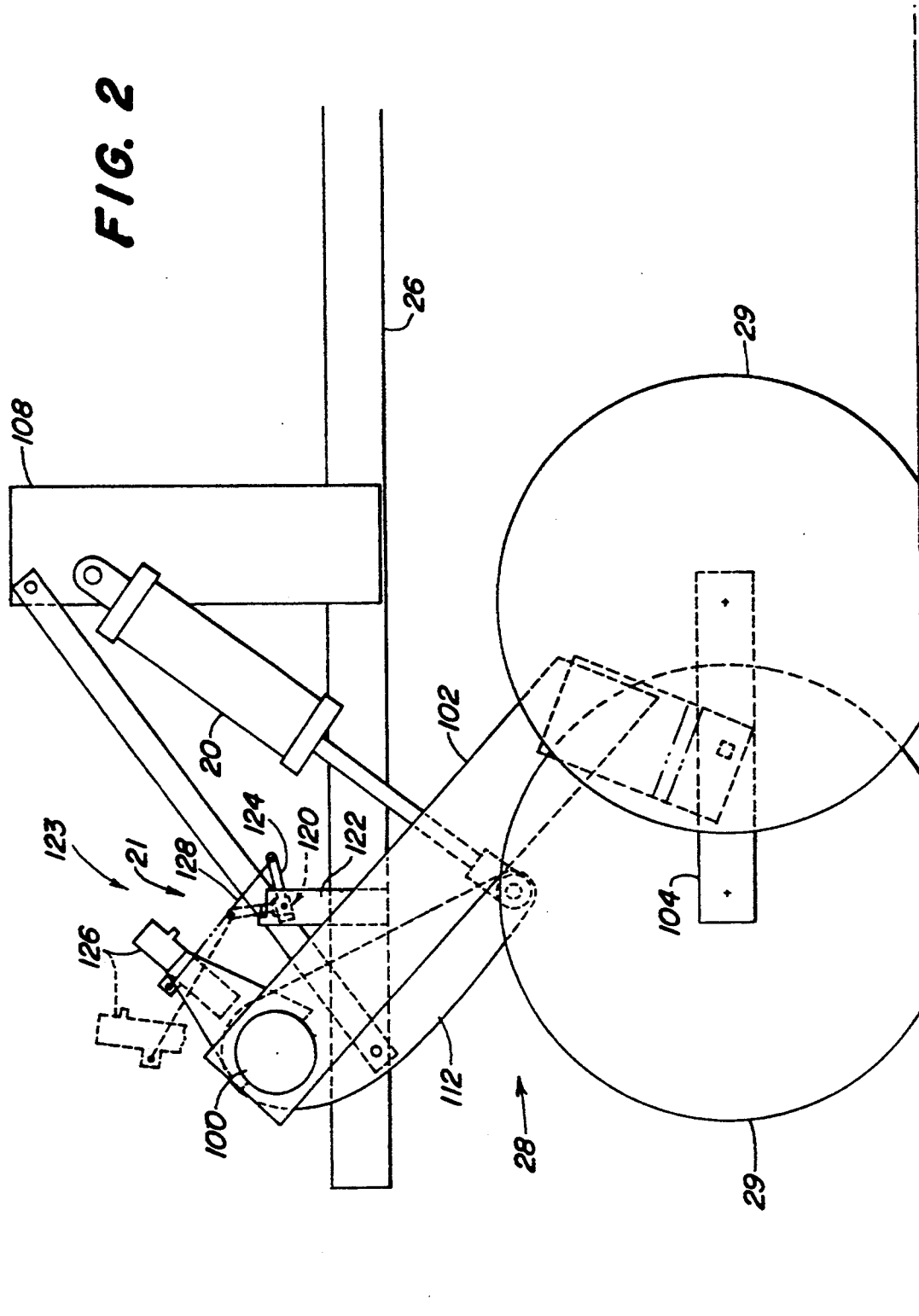
FIG. 2 is an enlarged view of a wheel lift assembly including a feedback potentiometer linkage constructed according to the present invention.

With the configuration of FIGS. 2 and 3, rotation of the rockshaft 10° in the field-working range (for example, from the V1 to V3 position of the arm 126 of FIG. 3) results in rotation of over 30° of the potentiometer shaft 120a (from the T1 to T3 position of the arm 124). Rotation of the rockshaft 10° in the upper range of raised transport positions results in less than about 8° of potentiometer shaft rotation. Roughly, over half of the potentiometer range corresponds to the depth control range of the implement even though the depth control range is only about a third or less of the entire vertical range of the implement. The simple linkage with the arm 126 fixed directly to the rockshaft 100 and the arm 124 fixed to the shaft 120a has few wear points so movement is precise without looseness. The amplified potentiometer rotation in the field-working range significantly increases accuracy and repeatability of the feedback signal.

Having described the preferred embodiment, it will become apparent that various modifications can be made without departing from the scope of the invention as defined in the accompanying claims.

We claim:

1. In a hydraulic system for an implement having a hydraulically activated rockshaft, and a lift wheel assembly including a lift arm connected to the rockshaft, the implement towed by a tractor having a source of hydraulic fluid under pressure, a control connected between the source and the rockshaft for rotating the rockshaft and moving the implement vertically over a range of raised transport positions and a range of lowered field-working positions including a lowermost field-working position, wherein the range of lowered field-working positions is typically smaller than the range of transport positions, a remote position device for providing a signal dependent on the vertical position of the implement, comprising:

a rockshaft lever connected to the rockshaft for rotation with the rockshaft and the lift arm over first and second ranges of angles corresponding respectively to the range of raised transport positions and the range of field-working positions of the implement, the first range of angles being greater than the second range of angles;

a position transducer having a movable member for providing a varying signal dependent on the position of the member; and means connecting the rockshaft lever and the movable member for amplifying rotational movement of the rockshaft in the second range of angles and thereby provide greater variance of the signal for movement of the rockshaft in the second range than for movement of the rockshaft in the first range.

2. The invention as set forth in claim 1 wherein the movable member comprises a rotating member and the means connecting the rockshaft lever and the movable member includes a transducer lever connected for rotation with the rotating member and means connecting the rockshaft and transducer levers.

3. The invention as set forth in claim 2 wherein the means connecting the transducer and rockshaft levers comprises a link pivotally connected to the transducer and rockshaft levers, the link and the transducer lever forming an acute angle with each other when the rockshaft is in the first range and an obtuse angle when the rockshaft is in the second range.

4. The invention as set forth in claim 3 wherein the angle between the link and the transducer lever is slightly less than 180° when the rockshaft is in the position corresponding to the lowermost field-working position of the implement.

5. The invention as set forth in claim 3 wherein the angle between the link and the rockshaft lever is approximately 90° when the rockshaft is in the position corresponding to the lowermost field-working position of the implement.

6. In a hydraulic system for an implement having a hydraulically activated rockshaft and towed by a tractor having a source of hydraulic fluid under pressure, a control connected between the source and the rockshaft for rotating the rockshaft and moving the implement vertically over a range of raised transport positions and a range of lowered field-working positions including a lowermost field-working position, wherein the range of lowered field-working positions is typically smaller than the range of transport positions, a remote position device for providing a signal dependent on the vertical position of the implement, comprising:

a rockshaft lever connected to the rockshaft for rotation with the rockshaft over first and second ranges of angles corresponding respectively to the range of raised transport positions and the range of field-working positions of the implement, the first range of angles being greater than the second range of angles;

a position transducer having a rotatable member for providing a varying signal dependent on the position of the member, and a transducer lever connected to the rotatable member; and means connecting the rockshaft lever and the transducer lever for amplifying rotational movement of the rockshaft in the second range of angles to thereby provide greater variance of the signal for movement of the rockshaft in the second range than for movement of the rockshaft in the first range, wherein the rockshaft lever has a length that is substantially greater than that of the transducer lever.

7. The invention as set forth in claim 6 wherein the distance between the axis of the rockshaft and the axis of rotation of the rotating member is greater than the sum of the lengths of the transducer and rockshaft levers.

8. In a hydraulic system for an implement having a hydraulically activated rockshaft and towed by a tractor having a source of hydraulic fluid under pressure, a control connected between the source and the rockshaft for rotating the rockshaft and moving the implement vertically over a range of raised transport positions and a range of lowered field-working positions, a remote position device for providing a signal dependent on the vertical position of the implement, comprising:

- a rockshaft arm fixed to the rockshaft and extending radially therefrom for rotation with the rockshaft over first and second ranges of angles corresponding respectively to the range of raised transport positions and the range of field-working positions of the implement, the first range typically being greater than the second range;
- a position transducer having a movable member for providing a varying signal dependent on the position of the movable member;
- a transducer lever connected to the movable member, the length of the transducer lever being less than the length of the rockshaft arm; and
- means connecting the rockshaft arm and the transducer lever for amplifying rotational movement of the rockshaft in the second range of angles to thereby provide greater variance of the signal for movement of the rockshaft in the second range than for movement of the rockshaft in the first range.

9. The invention as set forth in claim 8 wherein the transducer lever is rotatable about an axis parallel to but offset from the axis of rotation of the rockshaft.

10. The invention as set forth in claim 9 wherein the means connecting the transducer lever and rockshaft arm includes a link, the link forming an acute angle with the transducer lever when the implement is in the range of transport positions and an obtuse angle with the transducer lever when the implement is in the range of field-working positions.

11. The invention as set forth in claim 10 wherein the link and the rockshaft arm form an angle with each other within the range of from about 90° to about 180° as the implement moves from a fully lowered field-working position to a fully raised transport position, respectively.

12. The invention as set forth in claim 10 wherein the link and the rockshaft arm approach an overcenter position when the implement is in a fully raised transport position.

13. The invention as set forth in claim 11 wherein the length of the rockshaft arm is substantially greater than the length of the transducer lever.

14. The invention as set forth in claim 9 wherein the length of the rockshaft arm is substantially greater than the length of the transducer lever and wherein the link and the rockshaft lever approach an overcenter position when the implement is in the transport range of positions.

15. The invention as set forth in claim 14 wherein the link and transducer lever approach an overcenter position when the implement is in the field-working range of positions.

* * * * *